(12) United States Patent
Fayad et al.

(10) Patent No.: US 7,890,559 B2
(45) Date of Patent: Feb. 15, 2011

(54) FORWARD SHIFTING OF PROCESSOR ELEMENT PROCESSING FOR LOAD BALANCING

(75) Inventors: Camil Fayad, Poughkeepsie, NY (US); John K. Li, Woodstock, NY (US); Siegfried K. H. Sutter, Elsendorf (DE); Tamas Visegrady, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 1044 days.

(21) Appl. No.: 11/615,587

(22) Filed: Dec. 22, 2006

(65) Prior Publication Data

US 2008/0152127 A1 Jun. 26, 2008

(51) Int. Cl.
*G06F 17/00* (2006.01)

(52) U.S. Cl. .................................................... 708/233

(58) Field of Classification Search ........................ None
See application file for complete search history.

(56) References Cited

U.S. PATENT DOCUMENTS

| | | | |
|---|---|---|---|
| 4,262,331 A | 4/1981 | Freeland et al. | 364/200 |
| 4,451,881 A | 5/1984 | Grice et al. | 364/200 |
| 4,876,641 A | 10/1989 | Cowley | 364/200 |
| 4,925,311 A | 5/1990 | Neches et al. | |
| 5,287,532 A | 2/1994 | Hunt | 395/800 |
| 5,321,752 A | 6/1994 | Iwamura et al. | |
| 5,448,639 A | 9/1995 | Arazi | |
| 5,471,592 A | 11/1995 | Gove et al. | |
| 5,477,221 A | 12/1995 | Chang et al. | 341/51 |
| 5,504,919 A | 4/1996 | Lee et al. | 395/800 |
| 5,513,133 A | 4/1996 | Cressel et al. | |
| 5,666,411 A | 9/1997 | McCarthy et al. | |
| 5,764,554 A | 6/1998 | Monier | |
| 5,825,878 A | 10/1998 | Takahashi et al. | |
| 6,067,609 A | 5/2000 | Meeker et al. | 712/11 |
| 6,108,524 A | 8/2000 | Hershey et al. | |
| 6,141,756 A | 10/2000 | Bright et al. | |

(Continued)

FOREIGN PATENT DOCUMENTS

EP 0908810 A1 6/1998

(Continued)

OTHER PUBLICATIONS

Kornerup, Peter, "A systolic, Linear-Array Multiplier for a Class of Right-Shift Algorithms," IEEE Transactions on Computers, vol. 43, No. 8, Aug. 1994, pp. 892-898.

(Continued)

*Primary Examiner*—David H Malzahn
(74) *Attorney, Agent, or Firm*—John E. Campbell; Blanche E. Schiller, Esq.; Heslin Rothenberg Farley & Mesiti P.C.

(57) ABSTRACT

A data processing system, which is particularly useful for carrying out modular multiplication, especially for cryptographic purposes, comprises a plurality of independent, serially connected processing elements which are provided with data in a cyclical fashion via a control mechanism that is capable of transferring data from a set of registers to earlier ones in the series of the serially connected processing elements, at the end of a predetermined number of cycles.

10 Claims, 7 Drawing Sheets

U.S. PATENT DOCUMENTS

| | | | |
|---|---|---|---|
| 6,260,087 B1 | 7/2001 | Chang | |
| 6,360,303 B1 | 3/2002 | Wisler et al. | |
| 6,363,475 B1 | 3/2002 | Dowling | |
| 6,366,117 B1 | 4/2002 | Pang et al. | |
| 6,378,072 B1 | 4/2002 | Collins et al. | |
| 6,384,628 B1 | 5/2002 | Lacey et al. | |
| 6,546,104 B1 | 4/2003 | Shimbo et al. | |
| 6,578,068 B1 | 6/2003 | Bowman-Amuah | |
| 6,687,735 B1 | 2/2004 | Logston et al. | |
| 6,789,256 B1 | 9/2004 | Kechriotis et al. | |
| 6,819,133 B1 | 11/2004 | Kliesner et al. | |
| 6,978,016 B2 | 12/2005 | Chen et al. | 380/28 |
| 6,996,713 B1 | 2/2006 | Trimberger | |
| 7,080,110 B2 | 7/2006 | Chen et al. | 708/491 |
| 7,251,804 B1 | 7/2007 | Trimberger | |
| 2002/0059353 A1 | 5/2002 | Koc et al. | |
| 2002/0078308 A1 | 6/2002 | Altman et al. | |
| 2002/0166062 A1 | 11/2002 | Helbig, Sr. | |
| 2002/0191793 A1 | 12/2002 | Anand et al. | |
| 2002/0199110 A1 | 12/2002 | Kean | |
| 2003/0086300 A1 | 5/2003 | Noyes et al. | |
| 2003/0133574 A1 | 7/2003 | Caronni et al. | |
| 2003/0163431 A1 | 8/2003 | Ginter et al. | |
| 2003/0191922 A1 | 10/2003 | Skull | 712/22 |
| 2004/0019771 A1 | 1/2004 | Quach | |
| 2004/0054706 A1 | 3/2004 | Kawamura | |
| 2004/0095596 A1* | 5/2004 | Rijavec | 358/1.15 |
| 2004/0123121 A1 | 6/2004 | Paaske et al. | |
| 2006/0004967 A1 | 1/2006 | Mithal et al. | |
| 2006/0059369 A1 | 3/2006 | Fayad et al. | |
| 2006/0059373 A1 | 3/2006 | Fayad et al. | |
| 2006/0107032 A1 | 5/2006 | Paaske et al. | |
| 2006/0230439 A1 | 10/2006 | Smith et al. | |
| 2007/0168676 A1 | 7/2007 | Fayad et al. | |

FOREIGN PATENT DOCUMENTS

| | | |
|---|---|---|
| JP | 050688032 | 3/1993 |
| JP | 05324277 | 12/1993 |
| JP | 09016379 | 1/1997 |
| JP | 09274560 | 10/1997 |
| JP | 11143688 | 5/1999 |
| JP | 11282351 | 10/1999 |
| JP | 2001051832 | 2/2001 |
| WO | 2001045318 | 6/2001 |
| WO | 0190903 A1 | 11/2001 |

OTHER PUBLICATIONS

Montgomery, Peter, "Modular Multiplication Without Trial Division," Mathematics of Computation, vol. 44, No. 170, Apr. 1985, pp. 519-521.

Smith, S.W. et al., "Building a High-Performance, Programmable Secure CoProcessor", Computer Networks, Elsevier Science Publishers BV, Amsterdam, NL, Apr. 23, 1999 (pp. 831-860).

Office Action for U.S. Patent No. 6,978,016 dated Aug. 18, 2004.

Office Action for U.S. Patent No. 7,080,110 dated Jul. 21, 2005.

Office Action for U.S. Appl. No. 11/551,432 dated Nov. 4, 2009.

Office Action for U.S. Appl. No. 11/331,918 dated Apr. 9, 2009.

Office Action for U.S. Appl. No. 11/331,918 dated October 29, 2009.

Office Action for U.S. Appl. No. 11/331,918 dated Mar. 3, 2010.

Office Action for U.S. Appl. No. 10/938,774 dated Oct. 10, 2007.

Office Action for U.S. Appl. No. 10/938,774 dated Apr. 18, 2008.

Sherger, M. et al., "Multiple Instruction Stream Control for an Associative Model of Parallel Computation," 2003.

Andrews, et al., "Programming Models for Hybrid CPU.FPGA Chips", IEEE Computer Society, Jan. 2004 (Reference cited on IDS for U.S. Appl. No. 10/938,774 filed on Apr. 1, 2005).

Fayad, C., "Montgomery Modular Arithmatic Implementation in Crypto Engines for System on Chip (SOC) Design", Thesis submitted to SUNY at Buffalo, Dec. 2003. (Reference cited on IDS for U.S. Appl. No. 10/938,774 filed on Apr. 1, 2005).

"Security Requirements for Cryptographic Modules", Federal Information Processing Standards Pub., FIPS PUB 140-2, Information Technology Laboratory, National Institute of Standards and Technology, Gaithersburg, MD 20899-8900, May 25, 2001 (Reference cited on IDS for U.S. Appl. No. 10/938,774 filed on Apr. 1, 2005).

"Secure Hash Standard", Federal Information Processing Standards Pub., FIPS PUB 180-1, Computer System Laboratory, National Institute of Standards and Technology, Gaithersburg, MD 20899-8900, Apr. 17, 1995 (Reference cited on IDS for U.S. Appl. No. 10/938,774 filed on Apr. 1, 2005).

"Secure Hash Standard", Federal Information Processing Standards Pub., FIPS PUB 180-2, Computer System Laboratory, National Institute of Standards and Technology, Gaithersburg, MD 20899-8900, Aug. 1, 2002 (Reference cited on IDS for U.S. Appl. No. 10/938,774 filed on Apr. 1, 2005).

"IBM 4758 Model 13 Security Policy", Secure Systems and Smart Cards Group, IBM T.J. Watson Research Center, Nov. 1999 (Reference cited on IDS for U.S. Appl. No. 10/938,774 filed on Apr. 1, 2005).

Suh et al., "AEGIS: A Single-Chip Secure Processor," Information Security Technical Report, 2005 (Reference previously cited on IDS for U.S. Appl. No. 11/615,587 filed Aug. 30, 2010).

Smith, S.W. et al., "Building a High-Performance, Programmable Secure CoProcessor", Computer Networks, Elsevier Science Publishers BV, Amsterdam, NL, Apr. 23, 1999 (pp. 831-860). (Reference cited on IDS for U.S. Appl. No. 10/938,774 filed on Mar. 30, 2006).

* cited by examiner

FORWARD SHIFTING OF PROCESSOR ELEMENT PROCESSING FOR LOAD BALANCING

CROSS-REFERENCE TO RELATED APPLICATIONS

This application contains subject matter which is related to the subject matter of the following documents, each of which is assigned to the same assignee as the present application. Each of the below listed documents is hereby incorporated herein by reference in its entirety:

U.S. Pat. No. 7,080,110 titled "Hardware Implementation for Modular Multiplication Using a Plurality of Almost Entirely Identical Processor Elements," issued Jul. 18, 2006.

U.S. Pat. No. 6,978,016 titled "Circuits for Calculating Modular Multiplicative Inverse," issued Dec. 20, 2005.

The above referenced issued patents are each members of a family of patent documents. The specifications of these documents are similar to the specifications of the other documents in the family.

TECHNICAL FIELD

The present invention is generally directed to encryption and decryption engines. In particular, it is directed to the use of a cryptographic engine which is constructed as a set of nearly identical processing elements which are capable of being operated in ways that make the best use of the time that each one spends in processing data inputs which are multiplication operands modulo N, a prime number. This engine is described in detail in U.S. Pat. No. 7,080,110, which is referenced above. More generally, the present invention is directed to the operation of any set of serially connected processing elements performing a multiplication operation, especially multiplication modulo a prime.

BACKGROUND OF THE INVENTION

The processing elements as described in the aforementioned U.S. Pat. No. 7,080,110 patent can be operated in a more efficient fashion. In particular, it is noted that the cited U.S. Pat. No. 6,978,016 discusses two modes of operation: a CRT (Chinese Remainder Theorem) mode of operation and a non-CRT mode. In CRT mode the chain of processing elements can be split so as to perform two Montgomery multiplication operations at the same time. In the non-CRT mode, all of the processing elements operate as a single chain. When operands of large size are presented to the engine, the rightmost processing element, $PE_0$, bears a heavy load of processing while processing elements further "down stream" experience a very light load. For example, the RSA implementation for the cryptography engine described in the patents cited above exhibited poor load balancing. In one case one Processing Element experienced 16 loadings while some others only had two loadings, a fact that makes meeting timing goals more difficult. This has a negative impact on the overall system time to completion.

SUMMARY OF THE INVENTION

A finite state machine or other convenient controller is employed to perform forward shifting operations or jumps to improve the load balancing along a chain of serially connected Processing Elements (PEs). In the present invention, Processing Element multiplexing is modified to improve the load balancing across the PE chain. Processing Elements are forward shifted to process non-consecutive data.

In accordance with one embodiment of the present invention, a data processing system comprises a plurality of independently connectable processing elements along with a plurality of registers for supplying data for processing by the processing elements. A control mechanism is also provided for supplying data from the registers to the processing elements, with the control mechanism being capable of providing a process sequence for said processing elements so as to effectively transfer the data from the registers so as to more even distribute processing load. Such a redistribution of load provides a more even distribution of temperature across chips embodying circuits of the present invention thus reducing regions of thermal hot spots and thus also easing design and cooling requirements.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
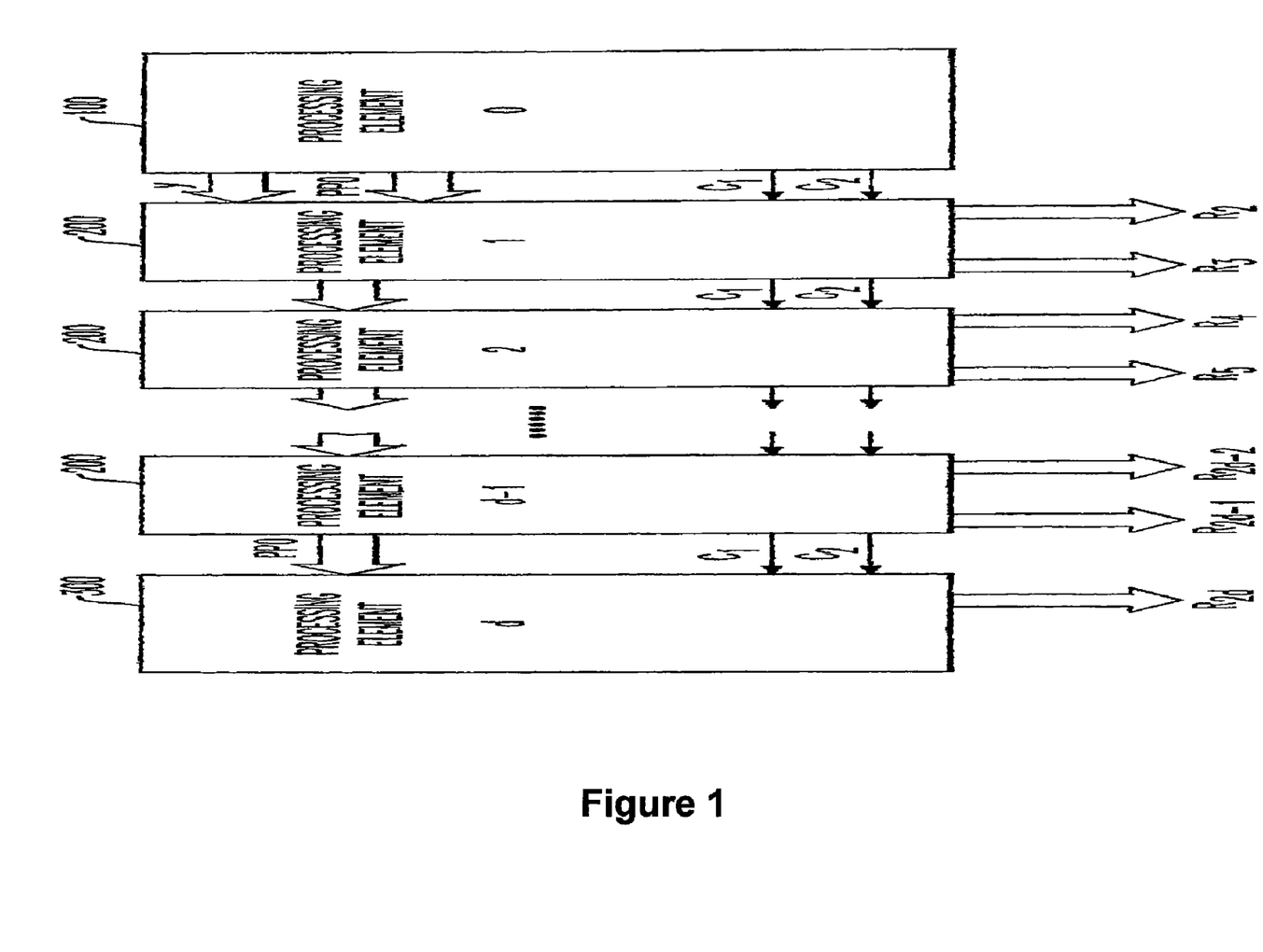
FIG. 1 is a block diagram illustrating how individual processor elements are connected to carry out multiplication modulo N in a manner which breaks the operands into smaller pieces for serial processing.

FIG. 1 illustrates the overall pattern of processing element connections employed for the purpose of carrying out multiplication modulo N. In particular FIG. 1 illustrates the connection pattern for the plurality of processing elements that are derived from the circuit structure shown in FIG. 6. FIG. 6 illustrates a modified Montgomery multiplication structure for multiplication modulo N from the point of view of carrying out the processing steps in two phases. The inventors in the cited patent realized that the "wide" processing elements in FIG. 5 can be broken up into a series of processing elements 200. These processing elements, as shown in detail in FIG. 6, are arranged serially as shown in FIG. 1 with the processing element on the right passing a Partial Product Output (PPO)

and two carries, C1 and C2, to the processing element on its left. For both the zeroeth and the last processing elements (100 and 300, respectively) minor changes are made in the circuitry as shown in the cited patent (FIG. 11 therein for the zeroeth or rightmost processing element and FIG. 15 therein for the leftmost processing element).

Figure 2:
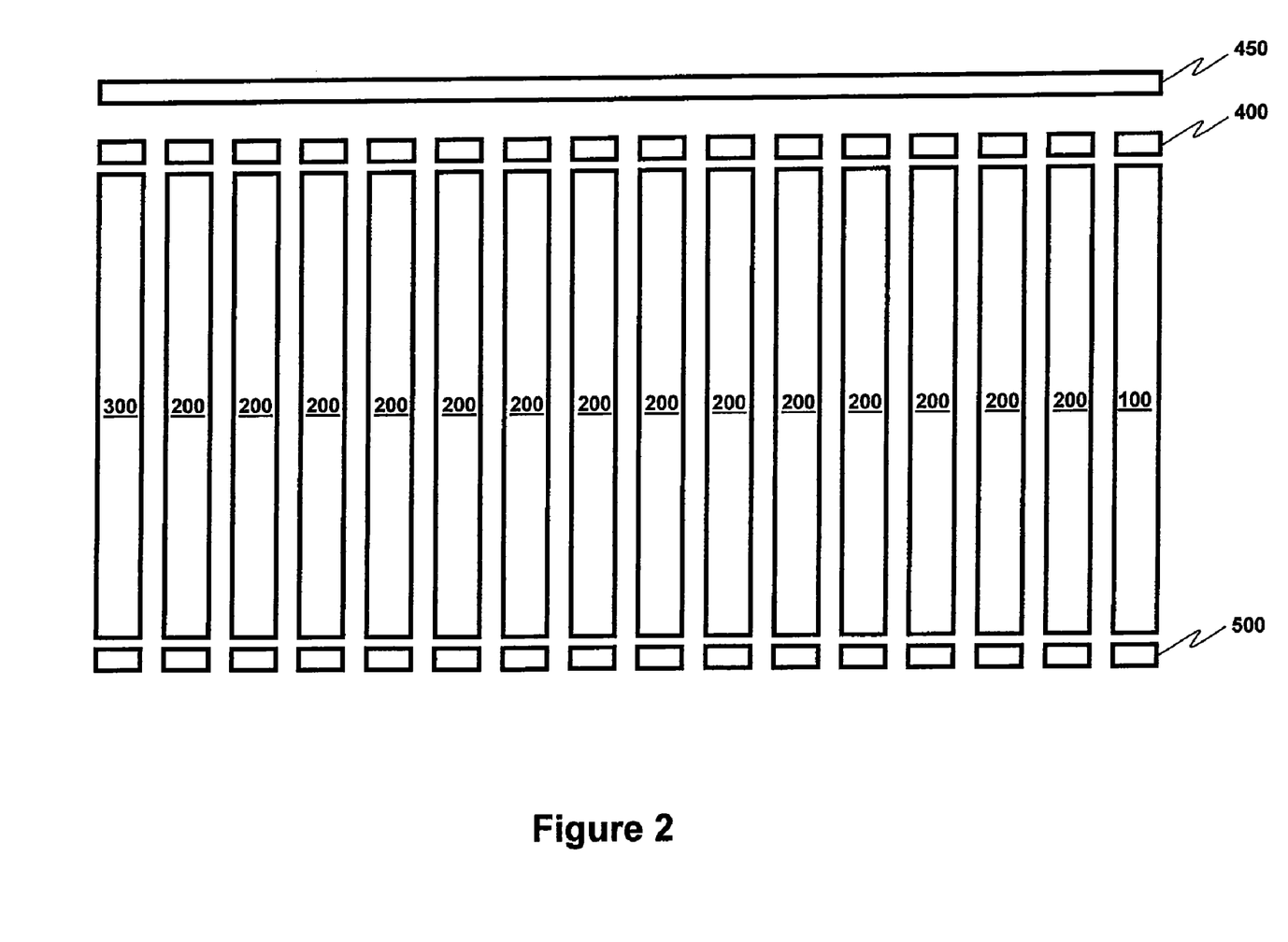
FIG. 2 is a block diagram more particularly illustrating the placement of a control mechanism for carrying out the forward shifting of Processor Elements.

The structure shown in FIG. 1 is shown in slightly more detail in FIG. 2. However, in FIG. 2 processing elements 100, 200 and 300 are shown in a configuration which more particularly illustrates the presence of bank 400 of input registers used for supplying data to the processing units. In a like fashion each processing unit is also associated with an output register from register bank 500. These two register banks are really the same structure as is shown in more detail in FIGS. 6 and 7. Most relevant to the present invention is the presence of Finite State Machine or controller 450. This controller is used to provide the correct data to each Processing Element at the correct time. The data and the timing which is implemented by controller 450 is set forth in FIGS. 3 and 4 as discussed below.

The Processing Elements of FIG. 1 constitute a collection of specialized data processing elements which perform multiple mathematical operations such as multiplication and Montgomery multiplication (that is, modulo N multiplication via the Montgomery algorithm). Each Processing Element (PE) operates on a data of a certain size. For example, consider the case in which each PE operates on 64 bits at a time. Suppose further that operand A is 140-bits long. Suppose further that operand B is 64-bits long. This means that normally this operation would require three Processing Elements. If only one Processing Element is available one can shift the Processing Element two consecutive times to process the full operand. If two Processing Elements are available one can shift $PE_1$ and $PE_2$ once.

Figure 3:
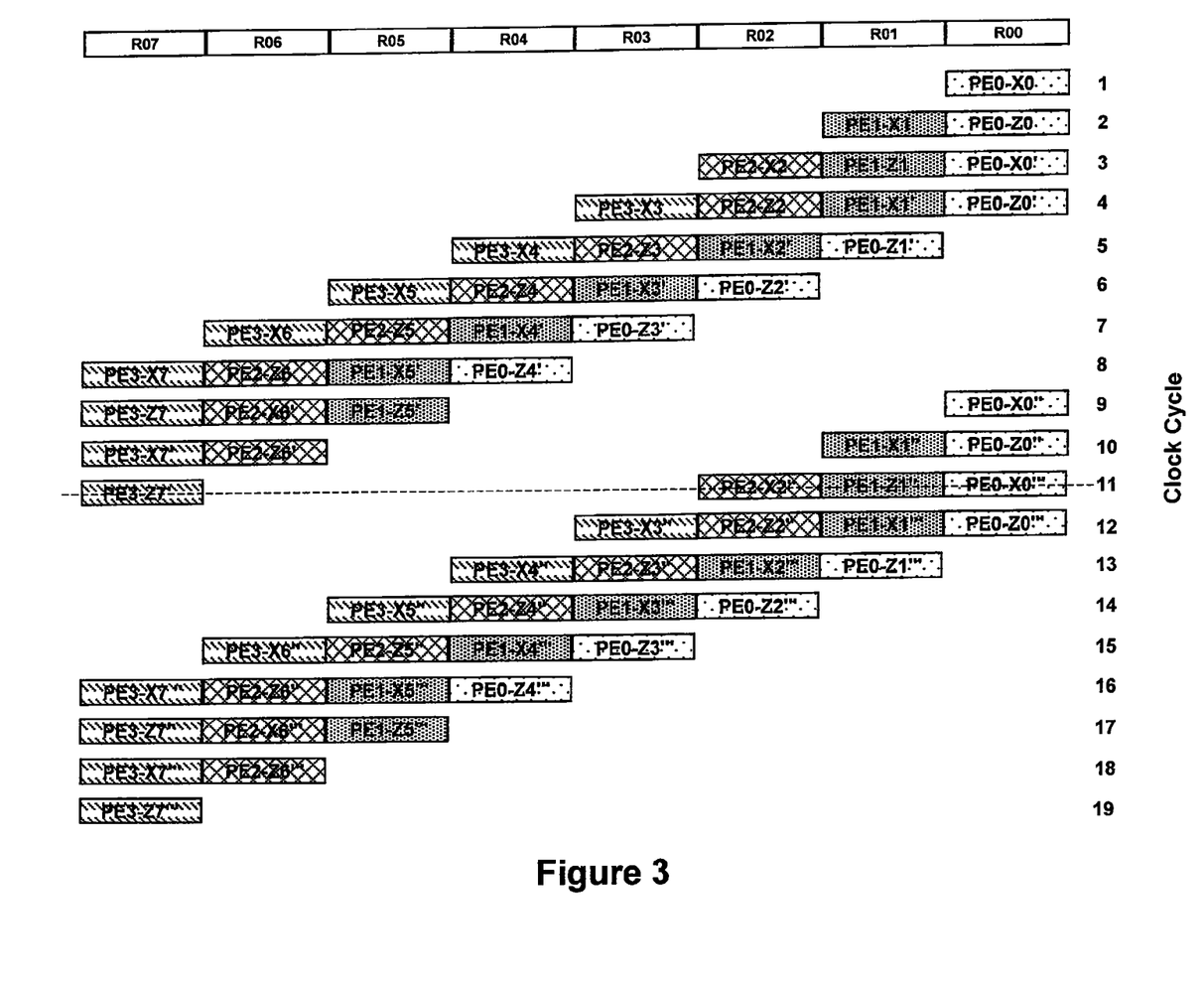
FIG. 3 is a cycle time diagram illustrating the processing that is normally carried out using the serially connected Processing Elements shown in the patents cited above.
Figure 4:
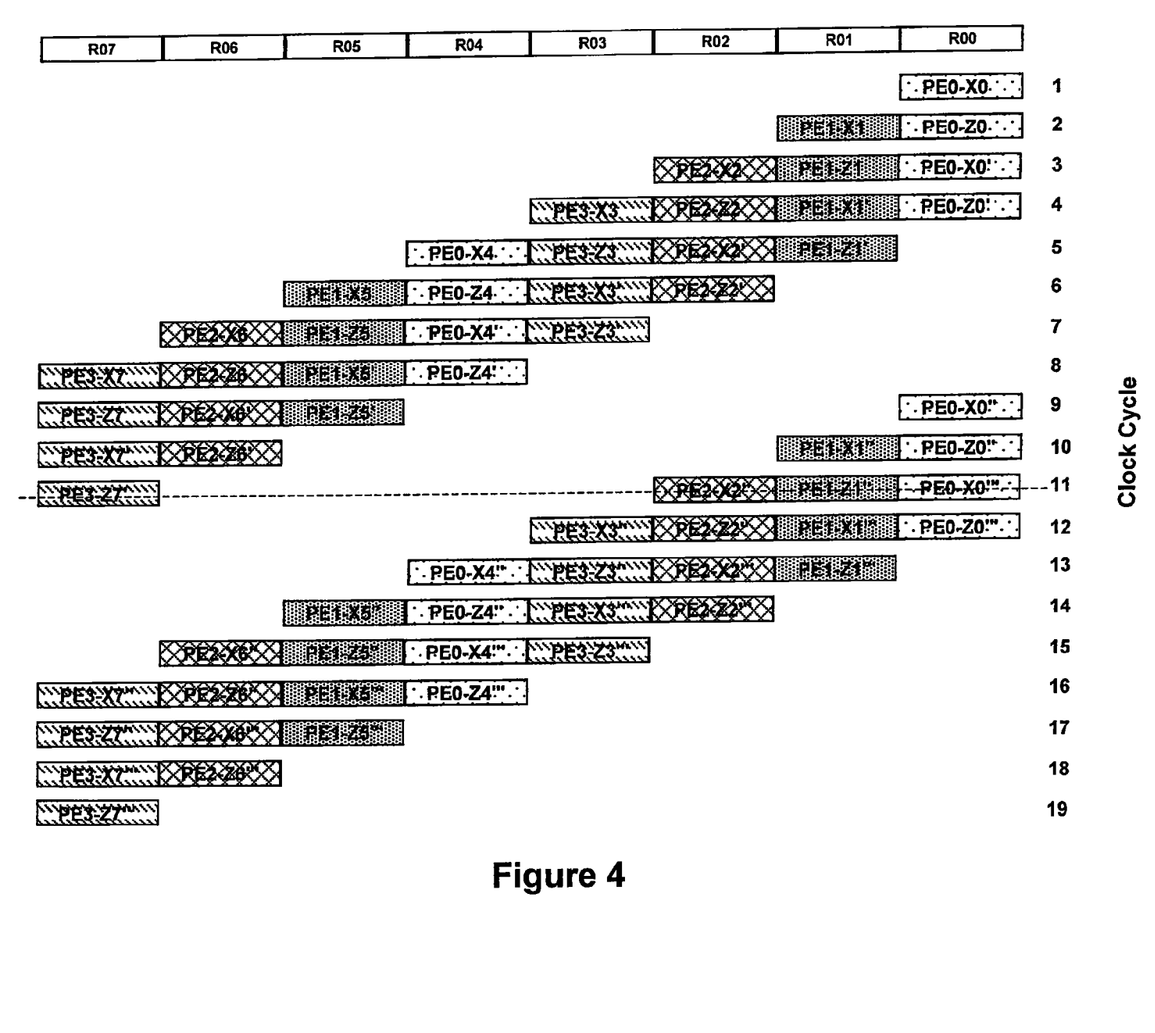
FIG. 4 is a cycle time diagram illustrating the processing that is carried out using the serially connected Processing Elements in the manner taught by the present invention.

In comparing FIG. 3 with FIG. 4, it is seen that the Processing Elements with the lightest stippling (the rightmost column in FIG. 3, for example) experience five loadings in the process illustrated in FIG. 3 in the first eight clock cycles. In stark contrast, however, it is seen that the same Processing Element in FIG. 4 experiences only two loadings. It is easier and allows one to meet timing designs to multiplex two items rather than five. And all of these benefits are easily achieved with the control of Processing Element inputs via a finite state machine or controller which implements the processing schema shown in FIG. 4.

While the timing advantages of the present invention are clearly its most obvious advantages, other benefits also accrue to the use of the modified process herein. In particular, the more uniform use of the Processing Elements means that there is a more uniform distribution of heat across the integrated circuit chip having this form of cryptographic engine. This is in addition to an overall power saving that is achieved via a more efficient operation. Additionally, less switching of large operands is required.

In one aspect of the present invention, the improved method provides a method for partitioning a time-space diagram for a collection of processors connectable in a variety of fashions through controllable multiplexing which does not alter the function performed by a normally serially connected set of Processing Elements. In this regard it is noted that each of the operations shown in FIG. 3 is also present within one of the blocks in FIG. 4. It is also noted that, unlike other serially connected processing units, the present invention takes advantage of the fact that each Processing Element has two phases of operation, herein called the x-phase and the z-phase. It is further noted that FIGS. 3 and 4 show a forward shifting after four cycles but that, in general, a different number of clock cycles may be employed. Indeed, for the number of Processing Elements shown, it can happen any time after the $4^{th}$ cycle is completed (meaning 5, 6, 7, 8, 9, etc. based on the number of PEs employed). The illustrations shown in FIGS. 3 and 4 illustrate only a preferred mode of operation based on the number of PE shown therein.

The processing that occurs in the method set forth in FIG. 3 is (in part) as follows. The processing discussed is "in part" in the sense that only the first few cycles are discussed with these being discussed up until the point in the chain of cycles in which the processing diverges. In cycle 1 $PE_0$ processes x-phase data from $R_0$. In the second cycle, $PE_0$ processes z-phase data from $R_0$ and $PE_1$ processes x-phase data from $R_1$. In the third cycle, $PE_0$ processes x-phase data from new data in $R_0$ (as reflected in the prime notation) and $PE_1$ processes z-phase data from $R_1$ while $PE_2$ processes x-phase data from $R_2$. In the fourth cycle, $PE_0$ processes z-phase data from the new data in $R_0$ and $PE_1$ processes x-phase data from new data in $R_1$ while $PE_2$ processes z-phase data from $R_2$ and $PE_3$ processes x-phase data from $R_3$.

Up through the fourth cycle, the processes carried out in FIGS. 3 and 4 are the same. However, at the fifth cycle, the processes diverge and the forward shifting aspects becomes evident.

FIG. 3 process, cycle 5: Processing element $PE_0$ processes z-phase data from R1, $PE_1$ processes x-phase data from the second round of $R_2$ data, $PE_2$ processes z-phase data from $R_3$ and $PE_4$ processes x-phase data from $R_4$.

FIG. 4 process cycle 5: Processing element $PE_1$ processes z-phase data from R1, $PE_2$ processes x-phase data from the second round of $R_2$ data, $PE_3$ processes z-phase data from $R_3$ and $PE_0$ processes x-phase data from $R_4$. It is in this sense that the operation performed by $PE_0$ is forward shifted after the fourth cycle to $R_4$.

The four types of shading shown in FIGS. 3 and 4 reflect this modification. It is also reflected in the table below where the shading pattern for FIG. 3 is seen to have been shifted forward (upward here) to produce the result shown in FIG. 4:

TABLE I

| FIG. 3 | FIG. 4 |
| --- | --- |
| Light stippling | Heavy stippling |
| Heavy stippling | Cross hatched |
| Cross hatched | Saw tooth |
| Saw tooth | Light stippling |

The stippling is coded as follows: light stippling for $PE_0$; heavy stippling for $PE_1$; cross hatching for $PE_3$; and a saw tooth pattern for $PE_3$. There is symmetry between FIGS. 3 and 4 in that each Processing Element occurs the same number of times in each Figure. However, in comparing FIGS. 3 and 4 it is easily seen that, say $PE_0$, is loaded with data five times in FIG. 3 but only twice in FIG. 4. The process shown in FIG. 4 is therefore easier and faster in terms of multiplexing the data from the register bank to the Processing Elements.

The Finite State Machine employed herein may be of the programmable variety. In that case it may be programmatically designed to make the Processing Elements perform forward shifting operations as set forth in FIG. 4 or operate to perform load balancing operations as described in U.S. patent application Ser. No. (POU-9-2005-0112) titled "Load Balancing For A System Of Cryptographic Processors" and filed on Oct. 20, 2006 and assigned to the same assignee as the present application. Load balancing helps closing on timing earlier.

Figure 5:
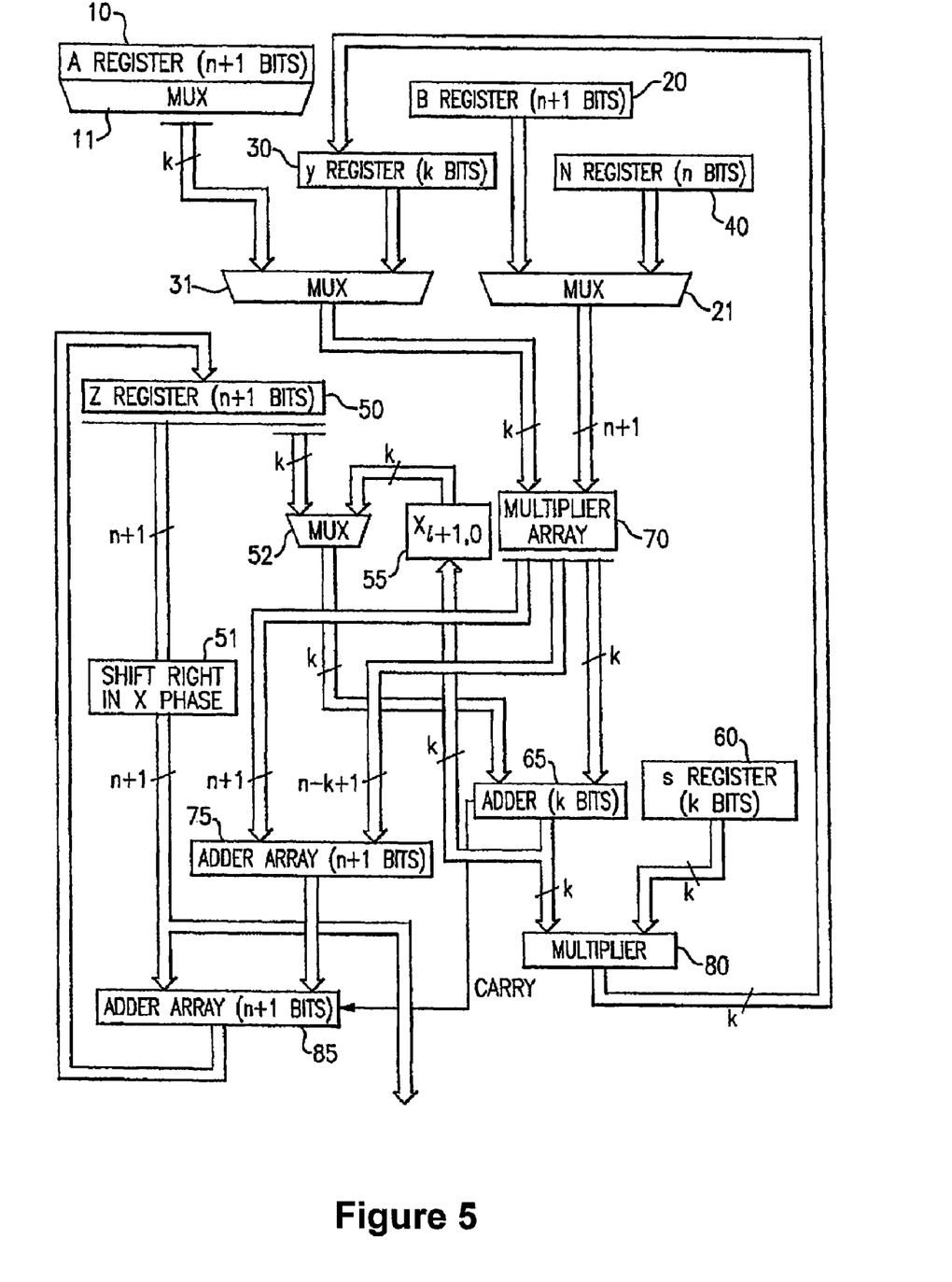
FIG. 5 is a block diagram illustrating the circuit that is partitioned into a sequence of processing elements for a method and system for multiplication modulo N.
Figure 6:
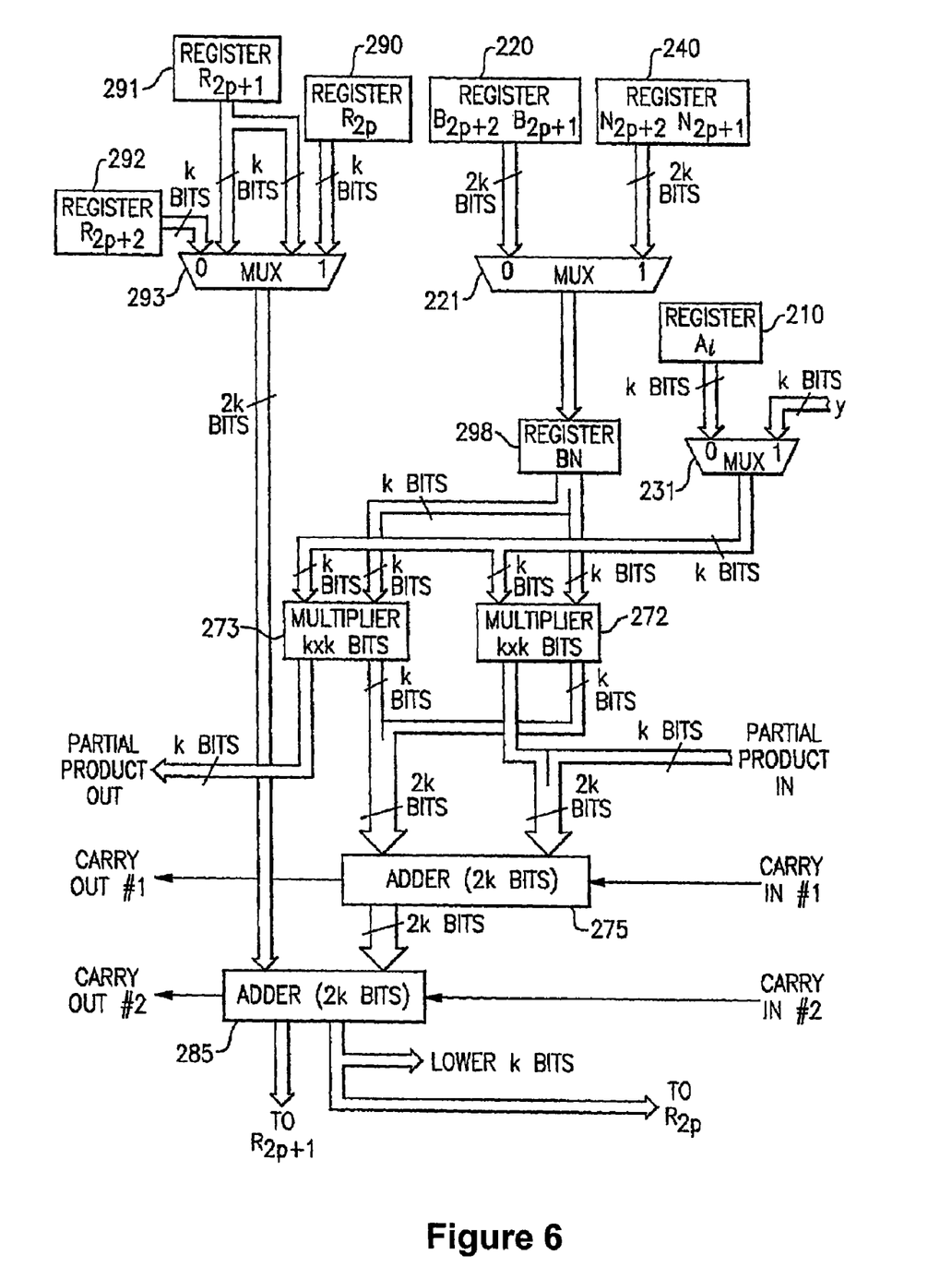
FIG. 6 is a block diagram providing a detailed view of the construction of one of the processing elements referred to in FIG. 1.
Figure 7:
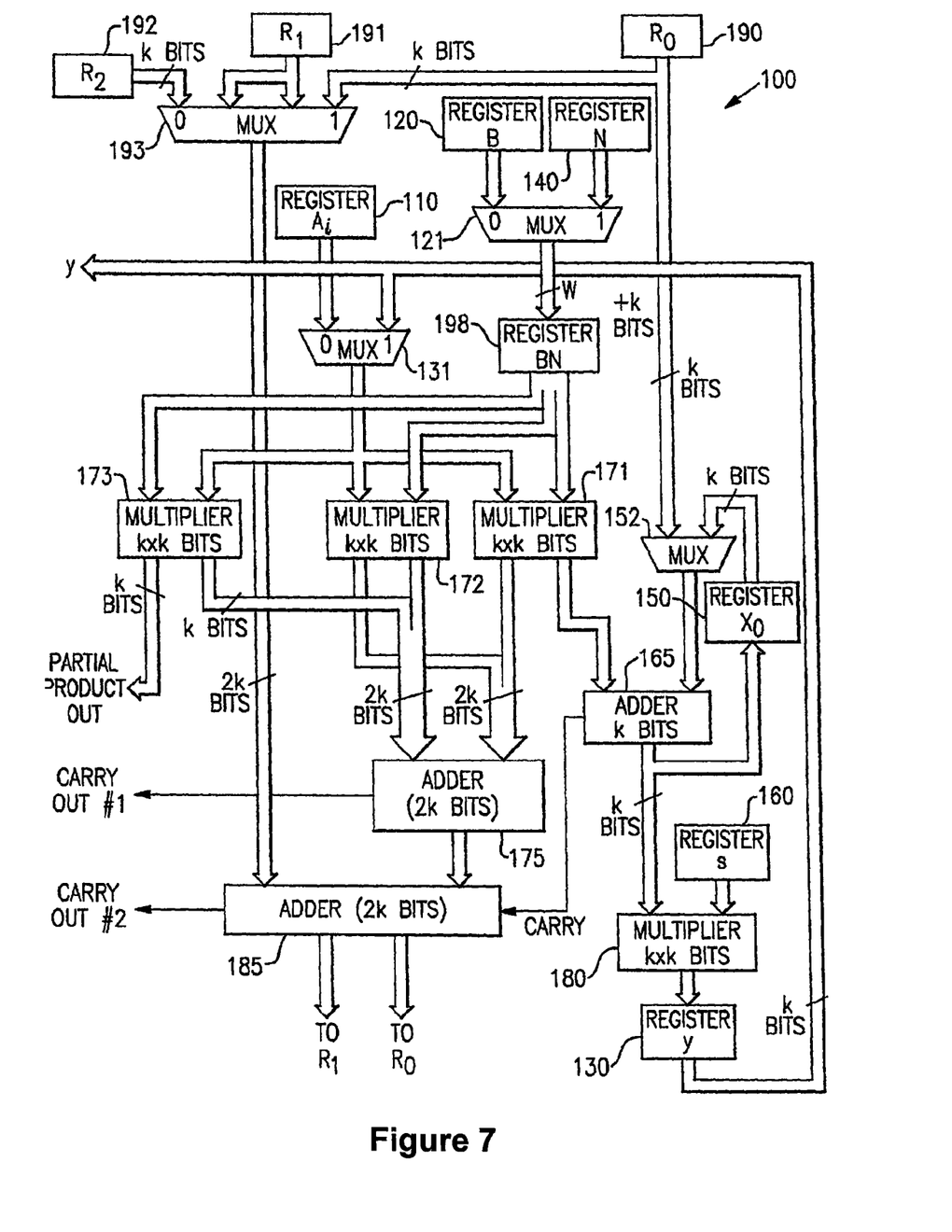
FIG. 7 is a block diagram providing a detailed view of the construction of the rightmost processing element, $P_0$.

FIGS. 5, 6 and 7 are discussed below. They are mainly relevant to the present invention in that they provide a description of Processing Elements that are employable with the schema set forth in FIG. 3 and also especially in FIG. 4.

A hardware circuit for carrying out this process is illustrated in FIG. 5. In particular, the factor A of n+1 bits, which is a factor which is treated as being in partitioned form, is stored in A register (10). Multiplexor 11 supplies sequential blocks of k bits from register 10 to multiplexor 31, with k=32 bits for illustration. Multiplexors 31, 21, and 52 operate in conjunction with one another selecting one of two possible input values depending upon whether or not the circuit is operating in the X-phase or the Z-phase. Accordingly, during the first phase of its operation, multiplexor 11 provides the k bits in $A_0$. In the first phase of the second cycle, the next k bits $A_1$ in A are supplied via multiplexor 11. A sub-block of k bits from A is provided during the initial or X phase portion of each cycle. In the third cycle, multiplexor 11, therefore, provides the next k bits in A, namely, the bits denoted above and herein as $A_2$. Accordingly, multiplexor 11 is seen to operate selectively as a function of the cycle number (namely, cycles 0 through m−1).

During the X-phase of each cycle, the value $A_1$ is selected from the A Register (10) via multiplexor 11 and correspondingly multiplexor 21 selects the contents of the B Register (20). Thus, the numbers to be multiplied are stored in registers 10 and 20. It does not matter which number is stored in which register. It is also noted that, whether or not the circuit is operating in the initial X-phase or in the final Z-phase in each cycle, multiplexors 31 and 21 supply k bits and n+1 bits, respectively, to multiplier array 70 in each phase. It is thus seen that, during the X-phase, multiplexors 31 and 21 select contents from the B register and part of the A register. It is also noted that, in one exemplar situation, the value of n is around 512 or some other convenient power of 2 and the value of k is 32. Accordingly, it is seen that multiplier array 70 strikes a balance between 1 bit×n bit multiplication and full n bit×n bit multiplication. It is also noted that increases in the value of n are almost always, in practice, an increase by a factor of a power of two.

As with any binary multiplier with inputs that are n+1 bits wide and k bits wide respectively, multiplier array 70 produces an output which is n+1+k bits wide. The lower order k bits from multiplier array 70 are supplied to adder 65 which is designed to add two k bit addends at a time. In this regard, it is noted that adder 65 is present in the circuit for computing $y_1$. As such, and given that the value of $y_1$ is dependent upon the last k bits of the value $X_1$ which is a sum which has not yet been fully computed, it is necessary to perform this addition which is essentially the addition for the low order k bits of $X_1$. The first addend comes from the rightmost k bits in the Z register as selected by multiplexor 52. These bits are added to the k bits in the rightmost portion of the product $A_1B$. The output of adder 65 is $x_{1,0}$ which is the least significant k bits of $X_1=Z_1+A_1B$. This output is stored in register 55 and is also supplied to multiplier 80 which multiplies two k bit numbers together. This is not, however, a multiplication modulo N. The other factor supplied to multiplier 80 is the number s from the s register (60). Since this result is required modulo R, only the rightmost k bits from multiplier 80 are supplied back to the y register (30) in this X-phase. The value stored in this register is used during the calculation carried out in the Z-phase as discussed below.

The rest of the X-phase calculation is devoted to calculation of the high order n+1 bits of the sum $Z_1+A_1B$. Multiplier 70 is configured as a circuit for multiplying together the bits from the B Register (20) and a sequence of m blocks of k bits each from selected k bit blocks from the A register. Multiplication of two k bit numbers generally produces a number having 2 k bits and, in particular, this is the situation with respect to applicants' multiplier 80. However, it is noted that the calculation of y, is computed modulo R. The modulo requirement of the computation is easily accomplished simply by returning only the rightmost k bits from the output of multiplier 80 to the input of y register 30.

As pointed out above, multiplication of numbers generally produces outputs having bit lengths greater than either of the two input number bit lengths. In particular, with respect to multiplier 70, the output is considered to be n+1+k bits in length. The low order (rightmost) k bit output is supplied from multiplier 70 to adder 65. However, each k bit block multiplication carried out in multiplier array 70 produces 2 k bits formed as a k bit "result" and a k bit "carry" into the next position. The summation to produce the desired intermediate output $A_1$ is carried out in adder 75 which adds together two portions, the first portion which is n+1 bits long and the second portion which is only n+1−k bits long. The n+1−k bits represent the "carry" portion of the multiplication. Accordingly, the output of adder array 75 is the result of the high order n+1 bits of $A_1B$. This result is supplied directly to adder array 85 which adds to it a shifted value of $Z_1$ from Z register 50. And appropriately, these high order n+1 bits of $X_1=Z_1+A_1B$ is stored in Z register 50 in preparation for the Z-phase calculation. The low order k bits of $X_1$ are stored in register 55 as described above.

In the Z-phase of an operation cycle, multiplier array 70 and adders 75 and 85 are again employed except that now the inputs to multiplier array 70 are the contents of y register 30 as selected by multiplexor 31. The other factor supplied to multiplier array 70 is the contents of N register 40 which is selected during the Z-phase of an operation cycle by means of multiplexor 21. As before, multiplier array 70 computes the product of an n+1 bit number and a k bit number. Adder array 75 performs the natural addition operation associated with multiplication in which there is an effective carry-like operation from one k bit subfield to the next k bit subfield. Accordingly, the output of adder array 75 during the Z-phase of operation is the high order n+1 bits of the product $y_1N$. The addition of $y_1N$ and the value $X_1$ together with its division by R in the present method is accomplished by discarding the low order k bits from the output of adder 65 and storing only the high order n+1 bits from adder 85 to register 50.

Attention is now directed to a discussion of FIG. 6 which illustrates a typical processor element and, in particular, which illustrates the form of a processor element which may be repeated in a circuit/system chain which is as long as is required to process factors which are n bits wide. Such a chain is shown in block diagram form in FIG. 1.

With reference to FIG. 6, it is noted that it describes a Processing Element that is similar to the zeroeth Processing Element $P_0$, except that the part of the processing dealing with k bit wide operations involving s and $N_0$ need not be present in any processing elements except $PE_0$. In particular, FIG. 6 indicates that the generic form of a processing element $PE_p$ bearing reference numeral 200 specifically does include register BN (reference numeral 298) but does not include the registers associated with $P_0$. One of the significant differences between the zeroeth Processing Element $P_0$ and the generic Processing Element $P_p$ is that register 220 contains only a portion of the bits for the second factor B. In particular, register 220 contains 2 k bit wide chunks designated as $B_{2p+2}$ and $B_{2p+1}$, where p ranges from 1 to d−1. Again, as above, multiplexer 221 selects either the 2 k bits from register 220 or the 2 k bits from register 240 which has corresponding portions (here 2 k bits chunks) of the variable N. Accordingly, BN register 298 is 2 k bits wide. In one exemplar embodiment of the present invention when n=512, register BN is 64 bits wide.

With specific reference to FIG. 7, it is seen that multiplexor 193 operates during the X-phase to supply a 2 k bit augend to adder 185. During the first or X-phase of operation, multiplexor 193 supplies a 2 k bit number which has leftmost bits from register R2 (reference numeral 192) and rightmost bits from register R$_1$ (reference numeral 191). During the second or Z-phase of operation, multiplexor 193 supplies a different 2 k bits of data to adder 185. In particular, during the Z-phase, multiplexor 193 supplies as its leftmost k bits the contents of register R$_1$, and as its rightmost k bits the contents of register R$_0$ (reference numeral 190).

In contrast to the full-width registers 10, 20, 40, and 50 in FIG. 5, the corresponding registers in a partitioned system have fewer bits. In particular, the corresponding B and N variable registers in a general processing element PE preferably employ a width equal to 2 k bits. However, for the rightmost processing element, P$_0$, a larger number of bits is desired. In particular, in the case in which n equals 512, registers 120 and 140 in FIG. 4 preferably have a width of 96 bits. Multiplexor 121 selects the contents of register B (reference numeral 120) during the X-phase of computation and likewise selects the contents of register N (reference numeral 140) during the Z-phase of computation. In general, the overall n-bit wide series of computations is broken down into partitions of any convenient size. It is not even necessary that all of the processor elements are the same size or that they process data having the same width. However, for conveniences of circuit design and circuit layout, it is preferable that each of the individual processing elements (except for the rightmost element, PE$_0$) have the same data processing capability in terms of data width. Therefore, in general, for purposes of consideration and discussion herein, it is assumed that there are a total of d+1 processing elements labeled from PE$_0$ through PE$_d$. Processing element PE$_0$ preferably has a structure such as that shown in FIG. 7. PE$_d$ has the preferred structure illustrated in FIG. 6 of U.S. Pat. No. 6,978,016 referred to above. However, it is noted that a the more generic structure, such as that shown in FIG. 6, may also be employed for the leftmost processor element PE$_d$ though it is not necessary that this leftmost processing element be any more complicated than that shown in the aforementioned FIG. 7.

Also, for purposes of convenience of circuit design, layout, and packaging efficiency, it is generally desirable that the data width, W, of each processing element be an integer multiple of k. In the designs presented herein for a value of n=64, processor elements PE$_1$ through PE$_{d-1}$, each process data in 2 k bit wide chunks. Thus, in this example, W=2 k, where W is the width of the data in each of the typical or generic forms of processing element. It is noted that processor element PE$_0$ as shown in FIG. 7 possesses an extra k bit processing capability, as is more particularly described below. Thus, if each typical processing element PE$_1$ processes data in W bit wide chunks and if there are d+1 processing elements with the rightmost processing element processing an extra k bits, then it is the preferred case that n=Wd+k. Thus, in general, the output of multiplexor 121 preferably comprises W+k bits. The leftmost third of these bits are supplied to multiplier 173, the middle third of the bits in register BN (reference numeral 198) are supplied to multiplier 172, and the rightmost third bits are supplied to multiplier 171. Multipliers 171, 172, and 173 are thus each k bit by k bit multipliers. In this regard, it is noted that the original relatively large multiplier array 70 in FIG. 5 employs an n bit by k bit multiplier. However, it is noted that the partitioning of the computation into a system employing a plurality of nearly identical processing elements results in the construction of circuits which now utilize multipliers which operate much more quickly since each multiplier now is typically only k bits by k bits. And clearly, since k is typically much less than n, processing takes place significantly faster.

The leftmost of the 2 k bits output from multiplier 173 are supplied as a partial product out (PPO) to the next unit in the chain, here P$_1$. In particular, it should be appreciated that in the discussions herein, that the natural order of processing is from the rightmost on through to the leftmost processing element in the chain. Thus, data is passed from one processing element to the processing element on its immediate left. However, it should be noted that left and right are relative terms useful essentially only for descriptive and understanding purposes. The rightmost k bits from multiplier 173 are supplied as the leftmost k bits of a 2 k bit augend supplied to adder 175. The rightmost k bits of this 2 k bit augend are supplied from the lower or rightmost k bits of multiplier 172. Thus, the rightmost k bits of multipliers 173 and 172, respectively, are combined, as shown in FIG. 6 to supply a 2 k bit wide augend to adder 175. Adder 175 also has as its other input a 2 k bit augend which is supplied from the leftmost k bits of multipliers 172 and 171, respectively, with multiplier 172 supplying the leftmost k bits of the 2 k bit augend and with multiplier 171 supplying the rightmost k bits of the 2 k bit augend supplied to adder 175. Thus, adder 175 is a 2 k bit wide adder. An equivalent but alternate connection arrangement is shown in FIG. 4A of the cited patent to Chen et al.

Multiplexor 152 operates to select, during the X-phase of computation, k bits from register R$_0$ (reference numeral 190). During the Z-phase, multiplexor 152 selects as its input the contents of temporary register 150 containing the variable x$_0$. The output of multiplexor 152 is supplied to adder 165 which is k bits in width. Adder 165 receives two augends, namely, the rightmost k bits from multiplier 171 and the k bits supplied from multiplexor 152. The output of adder 165 is stored in temporary register 150 and is also supplied to multiplier 180 which is also a k bit by k bit multiplier. The other factor supplied to multiplier 180 is the contents of register 160 which contains the variable s. (The calculation of s as $-1/N_0$ mod R is efficiently carried out in the circuit shown in the patent to Chen et al. for which the present invention is an improvement.) The output of multiplier 180 is supplied to register 130 which thus contains the value y as defined by the algorithm set out in the cited patent.

The output of register 130 is supplied to multiplexor 131 and is also supplied to the next processing element PE$_1$ (see FIG. 5). Multiplexor 131 operates to select a portion of the variable A which is one of the factors in the multiplication operation. (Other k bit wide portions of variable A are selected from registers associated with their respective processing elements.) In particular, in PE$_0$ register 110 contains the rightmost k bits of the variable A. Thus, during the X-phase of operation, multiplexor 131 operates to select the contents of register 110 to be supplied to multipliers 173, 172, and 171, as shown. Likewise, during the Z-phase of computation, multiplexor 131 operates to select the variable y from register 130 to be supplied to this same set of multipliers as the other factor.

A carry-out signal line from adder 165 is also supplied as a carry input to the lowest order position in adder 185, as shown. Additionally, adder 175 supplies a first carry-out signal line to the next processing element in the chain; similarly, adder 185 also supplies a second carry-out signal line to the next processing element in the chain. In particular, since FIG. 6 illustrates processing element PE$_0$, carry-out signal line 1 and carry-out signal line 2 are both provided to the specific processing element $PE_1$. The connections between $PE_0$ and $PE_1$ are readily apparent simply by placing FIG. 7 to the right of FIG. 6. In particular, processing element $PE_0$ supplies the variable y, the partial product out, and the two carry-out signal lines to the inputs shown in $PE_1$ of FIG. 6. In particular, it is also noted that the variable y (that is, the contents of register 130) is also supplied to each one of the individual processing elements, $PE_2$ through $PE_d$. And lastly, with respect to FIG. 7, it is noted that the output of adder 185 is supplied to registers $R_0$ and $R_1$ shown at the top of FIG. 7. As indicated above, it is the register set (containing $R_1$ and $R_0$ on the right) which ultimately contains the desired calculation result. Accordingly, reference numeral 400 in FIG. 2 does not include this register set. This register set is discussed separately above in terms of some of the other variations and structures that are employed in the present invention.

From an overall perspective, generic processing element $PE_p$ (reference numeral 200 as shown in FIG. 1) accepts, as input from the right, the value of y (but only from $P_0$), the partial product in (PPI), carry-in 1 ($C_1$) and carry-in 2 ($C_2$). Processor element $PE_p$ also has as an input the corresponding portion of the k bits of the multiplier factor A from register 210 (See FIG. 6). The register involvement for registers, 292, 291, and 290 is as shown in FIG. 5. It is these registers that store intermediate values between phases and ultimately store the completed product, AB mod N. Also, from an overall perspective, processor element 200 produces, as an output, a k bit partial product out which is supplied to the processor element on its left together with carryout signals 1 and 2 ($C_1$ and $C_2$) which are supplied to the corresponding adders 275 and 285 in the processor element on the left. The output of adder 285 is supplied back to registers $R_{2p+1}$ and $R_{2p}$. Accordingly, other than the connections to the register sets for R, B, N, and A, the processing elements are connected simply by matching partial products in and out and carries in and out ($C_1$ and $C_2$). Accordingly, in systems constructed in accordance with those aspects of the present invention which employ a plurality of similar processing units, the overall system is constructed by starting with the circuit shown in FIG. 4 or 4A of the cited patent as a rightmost position and placing, in adjacent positions, processing elements similar to those shown in FIG. 6 herein. The overall configuration, therefore, is seen in FIG. 1. However, it is noted that in the present invention control of which Processing Element receives which portion of the operand data is controlled by Finite State Machine or controller 450 so as to implement the processing order set forth in FIG. 3 or 4.

The capabilities of one or more aspects of the present invention can be implemented in software, firmware, hardware or some combination thereof. It is noted that, while the present invention is directed to the use of Processing Elements that operate in two phases (an x-phase and a z-phase), the present inventive techniques are also employable in the more general case where operational phases are not present.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A data processing system comprising:
    a plurality of independently serially connected processing elements having two phases of operation;
    a plurality of registers for supplying data for processing by said independent processing elements; and
    a control mechanism for supplying data from said registers to said plurality of processing elements, said control mechanism providing a process sequence for said processing elements to effectively transfer said data from said registers to said plurality of processing elements to distribute processing load among the plurality of processing elements.

2. The system of claim 1 in which said serially connected processing elements perform modular multiplication.

3. The system of claim 1 in which said serially connected processing elements are structured to carry out cryptographic operations.

4. The system of claim 1 in which said control mechanism is a finite state machine.

5. The system of claim 1 in which said process sequence produces a forward shifting of data to otherwise idle processing elements.

6. A method for providing data to a plurality of independently serially connected data processing elements having two phases of operation, said method comprising controlling supply of data to said processing elements to provide a processing sequence for said processing elements which effectively transfers said data from said registers to said plurality of processing elements to distribute processing load among the plurality of processing elements.

7. The method of claim 5 in which said serially connected processing elements perform modular multiplication.

8. The method of claim 6 in which said serially connected processing elements are structured to carry out cryptographic operations.

9. The method of claim 6 in which said control mechanism is a finite state machine.

10. The method of claim 6 in which said processing sequence produces a forward shifting of data to otherwise idle processing elements.

* * * * *